United States Patent [19]

Kakuta

[11] Patent Number: 5,280,143
[45] Date of Patent: Jan. 18, 1994

[54] MUFFLER WITH A SCAVENGING EFFECT

[76] Inventor: Yoshiaki Kakuta, 1-8-1, Hamakawado, Kasukabe-shi, Saitama-ken, Japan

[21] Appl. No.: 70,899

[22] Filed: Jun. 3, 1993

[30] Foreign Application Priority Data

Dec. 4, 1992 [JP] Japan .................. 4-350555

[51] Int. Cl.$^5$ ............................................. F01N 1/02
[52] U.S. Cl. .................... 181/250; 181/253; 181/257
[58] Field of Search ............... 181/228, 238, 250, 251, 181/252, 253, 266, 268, 273, 275, 276; 60/319, 324

[56] References Cited

U.S. PATENT DOCUMENTS

| | | | |
|---|---|---|---|
| 4,819,428 | 4/1989 | Ciccarone | 181/268 X |
| 4,905,633 | 3/1990 | Kakuta | 123/41.64 |
| 4,909,034 | 3/1990 | Kakuta | 60/324 |
| 4,913,260 | 4/1990 | Fallon | 181/228 X |
| 4,926,638 | 5/1990 | Kakuta | 60/319 |
| 5,014,512 | 5/1991 | Kakuta | 60/319 |

FOREIGN PATENT DOCUMENTS 832895 10/1938 France .
1263892 10/1986 U.S.S.R. .
2074249 10/1981 United Kingdom .

Primary Examiner—Michael L. Gellner
Assistant Examiner—Khanh Dang
Attorney, Agent, or Firm—Jacobson, Price, Holman & Stern

[57] ABSTRACT

A muffler disposed close to the atmospheric discharge end of the exhaust system, consisting of an accelerating part (4) which accelerates the exhaust gas flow and a negative pressure chamber (5) which generates negative pressure in association with the acceleration thereof. Said negative pressure acts to connect the negative pressure chamber (5) with the flow-distributing chamber (2) disposed on the exhaust pipe (1) at the upper stream of the silencing part (19) by means of the bypass (9), in order to promote suction of the exhaust gas flow. The flow-distributing chamber (2), which has a larger cross-sectional area than that of the exhaust pipe (1), contains at its center an exhaust port (3) which is opened to the accelerating part (4), and flow-distributing holes (7) that are opened to the bypass (9) in the peripheral area.

7 Claims, 3 Drawing Sheets

MUFFLER WITH A SCAVENGING EFFECT

BACKGROUND OF THE INVENTION

The present invention relates to purge combustion gas (exhaust gas) from a combustion chamber in an internal combustion engine and replaces it with new fuel and air (new charge), that is exhaust gas scavenging, and specifically to a muffler (a silencer) that accelerates the replacement of exhaust gas in a combustion chamber with new charge by using negative pressure generated from the accelerating flow rate of the exhaust gas.

PRIOR ART

Exhaust gas generated in a combustion chamber should be discharged into the atmosphere directly from the combustion chamber, or from the cylinders in a piston engine, etc. for engine efficiency. However, as exhaust pipes are used to keep the discharge position away from an operator, and a silencing device and/or catalyzing device is also installed, the back pressure is so excessive that it disturbs the gas discharge, resulting in a reduced scavenging effect. The inventor of the present invention has previously invented a device to accelerate flow rates for the exhaust gas flow, and has applied for a patent. The invention is described in the Japanese laid-open patent application 2-125906, or the U.S. Pat. No. 5,014,512, which is based on said invention.

According to said invention which can accelerate the flow rates of the exhaust gas flow, it is possible to reduce the back pressure to some extent in the exhaust system. Therefore, the exhaust gas is purged more smoothly from the combustion chamber and new charge in-flow is relatively accelerated. However, since said invention applied no methods other than accelerating the exhaust gas flow, the improvement in scavenging effect was limited.

SUMMARY OF THE INVENTION

The present invention has been made by taking the above points into consideration, and its objective is to perform more complete gas scavenging, that is displacing exhaust gas in a combustion chamber with new charge at higher efficiency by fully using the negative pressure obtained from highly accelerating the flow rate of the exhaust gas discharged from the combustion chamber.

Above and other objects have been attained by such means that a flow-distributing chamber (2) to distribute the exhaust gas flow, with a flow cross-section area that is expanded so that it is larger than that of an exhaust pipe (1) is connected to a center exhaust port (3) formed at the center of said flow-distributing chamber (2) at its front end; its rear end forms an accelerator (4) with a reduced flow cross section area to accelerate the exhaust gas flow flowing therein making it a high-velocity gas flow; a negative pressure generator (6) with a negative pressure chamber (5) and a flow cross-section area expanded larger than that of the accelerator (4) downstream is combined with a bypass path (9) to suck the exhaust gas flow in the outer layer into the negative pressure chamber (5) from the flow-distributing chamber (2) using the high negative pressure generated in the negative pressure chamber (5), through a flow-distributing port (7) opened to the flow-distributing chamber (2) and a suction port (8) opened to the negative pressure chamber (5); and a silencing part (19) which is disposed between said negative pressure chamber (5) and the flow-distributing chamber (2).

The negative pressure generator (6) having said accelerator (4) and the negative pressure chamber (5), together with the flow-distributing chamber (2) connected therewith by the bypass path (9) are the means used to suck the exhaust gas flow upstream of the flow-distributing chamber (2) downstream using the negative pressure, wherein the exhaust gas is discharged forcibly from a combustion chamber (10) by means of a pressure difference resulting from the negative pressure sucking action, and is replaced with new charge.

The sucking action of the negative pressure formed by the acceleration of the exhaust gas flow constantly sucks the upstream exhaust gas flow downstream, greatly raises the flow rate of the exhaust gas flow, and reduces the back pressure.

Conventionally, a supercharger has been used to force air into a combustion chamber and increase the scavenging amount. Although the supercharger forces in new charge using strong positive pressure, which is the opposite of the sucking action that uses negative pressure in this invention. In forcing in new charge with positive pressure, if a downstream pressure, or a pressure in an exhaust pipe in this case, is too high, a problem is created that this excessive pressure works as a resistance simply to raise the forcing pressure still higher but does not accelerate scavenging. In contrast, the present invention deadens the "pressure resistance" by means of the negative pressure sucking action, thereby achieving a great improvement in scavenging efficiency.

DETAILED DESCRIPTION OF PREFERRED EMBODIMENTS

The present invention is explained in detail with reference to the drawings.

Figure 1:
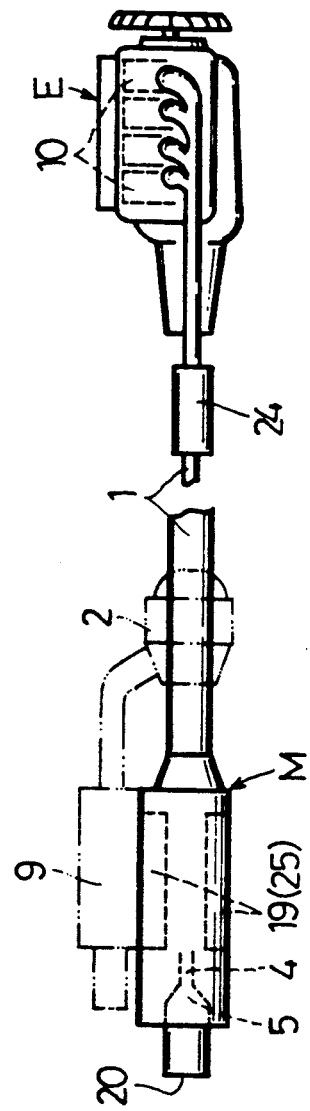
FIG. 1: A typical side view showing the system of an internal combustion engine equipped with a muffler that has a scavenging accelerating effect according to the present invention.
Figure 2:
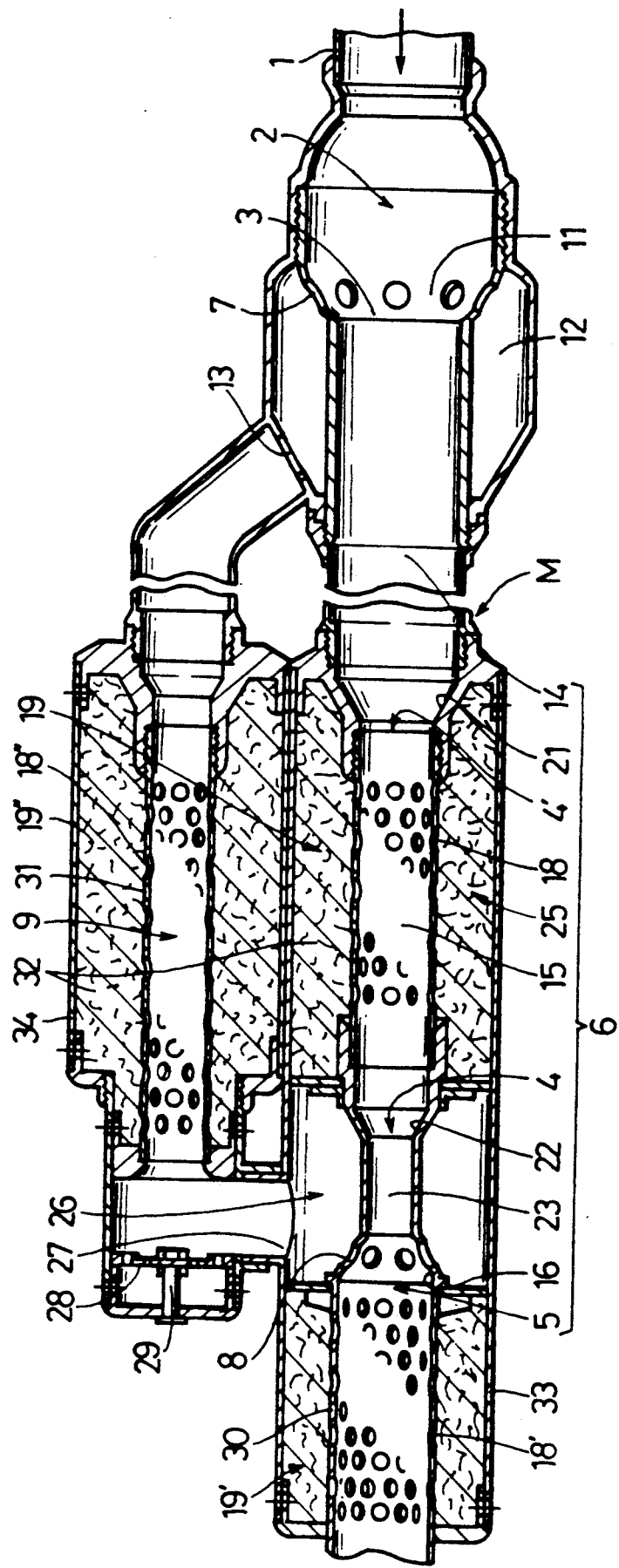
FIG. 2: A longitudinal cross section of the above equipment related to the first embodiment.

FIG. 1 summarizes the arrangement of the muffler (M) that accelerates the scavenging effect according to the present invention, a piston engine (E), and its exhaust system, wherein the scavenging device according to the present invention is disposed close to an atmospheric discharge end (20) of the exhaust pipe (1) in which exhaust gas generated in the combustion chamber (10) flows, to maintain acceleration by the accelerator (4). FIG. 1 includes two embodiments. In FIG. 1, the arrangement which has the flow-distributing chamber (2) drawn by chain lines is a summary illustration of the first embodiment, which is also shown in FIG. 2 in detail.

In the first embodiment, the flow-distributing chamber (2) that distributes the exhaust gas flow is positioned upstream of the exhaust pipe (1), which comes with a muffler according to the present invention. The illustrated flow-distributing chamber (2) is connected straight to the exhaust pipe (1), and has a concentrically expanded cross-section shape, by which the exhaust gas flow tends to expand and become depressurized in the flow-distributing chamber (2). The part starting from a section with the largest diameter in the flow-distributing chamber (2) toward the center exhaust port (3) downstream the flow-distributing chamber (2) forms a slanted rear wall (11) with its cross section decreased gradually. Since the center exhaust port (3) is shown to have nearly the same diameter as the exhaust pipe, the flow cross-section area is that much larger than that in the outward direction, i.e. the diameter of a hypothetical flow linking the upstream exhaust pipe (1) with the center exhaust port (3). Flow-distributing holes (7) are opened annularly to the rear wall (11) in this part, as will be described later.

The accelerator (4) using said center exhaust port (3) as its front end is disposed following the flow-distributing chamber (2). In the case of the first embodiment, a forward accelerator (4') is included in the main accelerator (4). In other words, the front end of a forward pipe (14) is connected to the center exhaust port (3), and on the rear end of the forward pipe (14) there is a forward tapered pipe (21) with a flow cross-section area that decreases gradually, and a forward accelerator (4') consisting of a parallel pipe (a forward throat) (15) extending toward the rear with the same diameter as is found on the smaller diameter side. Following the rear end of the parallel pipe, the main accelerator (4) consisting of a tapered pipe (22) with its flow cross-section area decreasing gradually and a parallel pipe (a main throat) (23) extending toward rear with the same diameter as on the small diameter side is disposed to accelerate the exhaust gas flow to its highest possible rate. In the main accelerator (4), the exhaust gas flow is so accelerated that power is lost due to resistance from the exhaust pipe (1) and other additional devices (24) and (25) such as a catalyst and silencer.

The negative pressure chamber (5) is disposed successively downstream of the main accelerator (4), and it has an expanded cross-section shape that is concentric with the center axis of the main accelerator (4), and which has a forward wall (16) slanted in reverse so that its cross-section area increases gradually starting at the rear end of the parallel pipe (23). A number of sucking holes (8) are opened annularly to the forward wall (16) so that the negative pressure in the negative pressure chamber (5) that has had its cross-section area increased can be used to suck the exhaust gas, the holes communicating with the flow-distributing holes (7) opened to the rear wall (11) in the flow-distributing chamber (2) and through the bypass path (9). The cross section of the negative pressure chamber (5) may be set optionally within a range larger than that of the parallel pipe (15) and smaller than that of the exhaust pipe (1).

An intermediate chamber (12) surrounds the outside of the flow-distributing chamber (2) and includes a bypass path (9), the intermediate chamber (12) being communicated with the flow-distributing chamber (2) via a large number of distributing holes (7) opened around the outer circumference of the distributing chamber (2). The bypass path (9) is constructed with one single tube-like path, and its front end is connected to a throughhole (13) opened to a rear wall of the intermediate chamber (12), while its rear end is connected to a rear throughhole (27) opened to a suction chamber (26) surrounding said sucking holes (8). A numeral (28) shows a regulation valve that can variably adjust the flow rates of the sucked air flow that passes through the bypass path (9). A numeral (29) shows an adjusting shaft thereof. The sizes of the areas for the flow-distributing holes (7) and the sucking holes (8) are determined by the throat diameter of the main accelerator (4).

A large number of noise-silencing holes (18), (18') and (18"), which serve to deaden exhaust noise from the exhaust pipe, are formed on the wall of a parallel pipe (15), a pipe (30) of the chamber (5) and a straight pipe (31) constituting the main part of the bypass path (9). Sound waves of exhaust are led into the silencing parts (19), (19') and (19") on the outer circumference of the pipes (15), (30) and (31) to deaden the sound of exhaust. The silencing parts (19), (19') and (19") are filled with acoustic materials as required. In FIG. 2, a numeral (33) shows a housing to enclose the outer side of the main flow path, and a numeral (34) shows a housing that encloses the outer side of the bypass path.

In the system of the first embodiment, which is constructed as described above, exhaust gas discharged from the combustion chamber (10) when a piston engine (E) is actuated is released into the atmosphere from the atmospheric discharge end (20) through the exhaust pipe (1), as is done with conventional exhaust pipes, except that the flow velocity of the exhaust gas flow is accelerated in the process of discharging the exhaust gas, thereby generating a powerful negative pressure, which sucks out the upstream exhaust gas flow.

In other words, the exhaust gas flow is accelerated sufficiently into the forward accelerator (4') and the main accelerator (4), and becomes a high-velocity gas flow that generates high negative pressure in the negative pressure chamber (5). The negative pressure in the negative pressure chamber (5) acts on the flow-distributing chamber (2) via the bypass path (9) to suck the exhaust gas flow along the outer layer of the flow in the chamber (2) into the negative pressure chamber (5) through the bypass path (9). As per Pascal's principle the negative pressure in the negative pressure chamber (5) of the flow-distributing chamber (2) has a direct action, whereas the upstream exhaust gas flow is forced downstream in a similar manner as well, thereby causing the exhaust gas in the combustion chamber (10) to be discharged quickly and replaced with new charge, thereby resulting in extremely efficient scavenging.

While in the case of the first embodiment a tubular path is communicating the negative pressure chamber (5) with the flow-distributing chamber (2), the flow rate of the exhaust gas flowing through the bypass path (9) is controlled by the cross-section area of one pipe in this case. A muffler that has been improved and the exhaust gas flow rate in the bypass path (9) has been raised to maximum is the one shown in the second embodiment.

Figure 3:
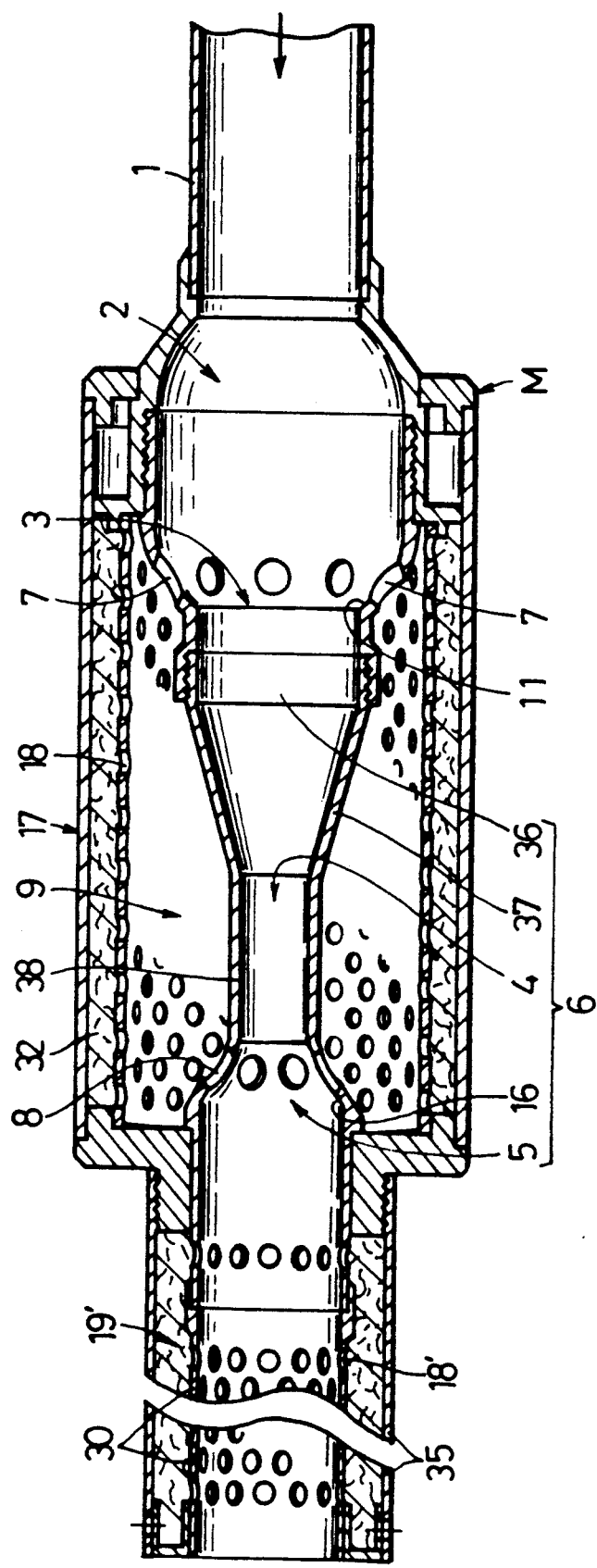
FIG. 3: A longitudinal cross section of the above equipment related to the second embodiment.

The device in the second embodiment is characterized as shown in FIG. 3 in that a number of flow-distributing holes (7) opened annularly to the rear wall (11) of the flow-distributing chamber (2) and a number of sucking holes (8) opened to the front wall (16) of the negative pressure chamber (5) are communicated with the bypass path (9) with the annular cross section completely surrounding the center exhaust gas flow path (35). In the second embodiment, a center exhaust port opened to the rear end of the flow-distributing chamber (2) is connected to an inlet (36) at the front end of the center exhaust gas flow path (35), whereas disposed at the rear part of the inlet (36) is an accelerator (4) consisting of a tapered pipe (37) with its cross-section area decreased gradually, and a parallel pipe (throat) (38) with the same diameter as found in the smaller diameter side extending toward the rear. Even though this accelerator (4) is so set that an exhaust gas flow can be accelerated to a sufficient velocity with a single step, it can be accelerated with two or more steps as in the first embodiment.

An externally sealed housing (17) is so disposed as to form a single space surrounding the outer side of an area from the flow-distributing chamber (2) to the accelerator (4) and the negative pressure chamber (5). Said space makes up the bypass path (9) communicating the flow-distributing holes (7) and the sucking holes (8), which is considered the same as the number of tubular bypass paths disposed around the negative pressure forming part (6) in the first embodiment in FIG. 2. Therefore, it is obvious that a configuration in which the two or more tubular bypass paths (9) in the first embodiment are disposed to communicate the flow-distributing holes (7) with the sucking holes (8) shall be included in the present invention.

In the case of the second embodiment, the silencing part (19) is disposed inside the housing (17) surrounding the bypass path (9). The part (19) includes silencing holes (18) and the required acoustic material (32) as in the first embodiment. Because other components such as the flow-distributing chamber (2) and the flow-distributing holes (7) form thereon, as well as the negative pressure chamber (5), the sucking holes (8), and the accelerator (4) can be identical with those in the first embodiment, the numerals in the first embodiment are also used in this figure, and all detailed descriptions are not repeated.

The scavenging effect of the device in the second embodiment is raised even higher than in the device in the first embodiment. As a result of the powerful negative pressure generated in association with the acceleration of the exhaust gas flow in the accelerator (4), the exhaust gas flow upstream of the flow-distributing chamber (2) can be sucked and discharged through the bypass path (9) in more quantity than in the case of the first embodiment. The bypass path (9) in the second embodiment has annularly surrounded the part (6) and has a sufficiently large cross-section area relative to the exhaust pipe cross-section area can suck an extremely large quantity of exhaust gas, thus raising the scavenging effect even more.

The muffler, according to the present invention, is described above to accelerate the flow velocity of an exhaust gas flow discharged from a combustion chamber. Moreover, it can suck the exhaust gas flow flowing in an exhaust pipe (1) upstream of the flow-distributing chamber (2) as a result of negative pressure generated in association with the flow velocity acceleration, while reducing back pressure to a minimum by the action of the negative pressure suction of the exhaust gas, and realizing an instantaneous discharge of the exhaust gas in the combustion chamber, and a new charge suction into the combustion chamber, making a very efficient scavenging operation possible. The accelerated displacement of exhaust gas with new charge allows for the complete combustion of fuel in the combustion chamber deadening factors for air pollution, and at the same time, greatly improving the scavenging effect by mounting the muffler onto the exhaust pipe (1). Hence, it can be implemented easily at a low manufacturing cost. Furthermore, the invention has a simple structure, and at the same time, includes no movable parts that may cause failures easily, thus making a high practicable applicability possible.

I claim:

1. A muffler with a gas-scavenging effect, which is disposed close to the atmospheric discharge end of an exhaust pipe in which exhaust discharged from a combustion chamber flows to accelerate the flow velocity of the exhaust gas flow, and promote displacement of the exhaust gas in the combustion chamber with new charge using negative pressure generated in association of the acceleration, wherein a flow-distributing chamber (2) that distributes the exhaust gas flow, having a flow cross-section area expanded so that it is larger than the flow cross-section area for said exhaust pipe (1) is connected at its front end with a center exhaust port (3) formed at the center of the flow-distributing chamber (2); its rear portion forms an accelerator (4) with its flow cross-section area reduced to accelerate the exhaust gas flow flowing therein and make it a high-velocity gas flow; a negative pressure generator (6) is disposed which has a negative pressure chamber (5) with a flow cross-section area expanded so that it is larger than that in the accelerator (4), downstream thereof, and a bypass (9) is disposed to suck the exhaust gas flow in an outer layer from the flow-distributing chamber (2), into the negative pressure chamber (5) through flow-distributing holes (7) opened to the flow-distributing chamber (2), and sucking holes (8) opened to the negative pressure chamber (5); and a silencing part (19) is disposed between said negative pressure chamber (5) and the flow-distributing chamber (2).

2. A muffler with a gas-scavenging effect as claimed in claim 1, wherein the flow-distributing chamber (2) has an axis that is concentric with the center axis of the exhaust pipe (1), a rear wall (11) so slanted that the cross-section area of the chamber is gradually decreased from its largest diameter part to the center exhaust port (3) which has nearly the same diameter as that of the exhaust pipe; and flow-distributing holes (7) are opened to this rear wall (11).

3. A muffler with a gas-scavenging effect as claimed in claim 1, wherein an intermediate chamber (12) surrounding the outer side of the flow-distributing chamber (2) is disposed, the intermediate chamber (12) connecting the flow-distributing holes (7) opened around the circumference of the flow-distributing chamber (2) with the bypass path (9), and the bypass path (9) being formed of one tubular path with its front end connected to a throughhole (13) and disposed on the trailing wall of the intermediate chamber (12).

4. A muffler with a gas-scavenging effect as claimed in claim 1, wherein a forward pipe (14) with its front end connected to the center exhaust port (3) on the flow-distributing chamber (2); a rear end of the forward pipe (14) is connected to a forward accelerator (4') with its flow cross-section area reduced; and the accelerator (4) with its flow cross-section area further reduced is disposed at the rear end of a parallel pipe (15) extending toward the rear of said forward accelerator (4').

5. A muffler with a gas-scavenging effect as claimed in claim 1, wherein the negative pressure chamber (5) has an axis that is concentric with the center axis of the accelerator (4) and an expanded cross-section, a front wall (16) so slanted that the cross-section area of the chamber is gradually increased from the smallest diameter part of the accelerator (4), and sucking holes (8) are opened to the front wall (16).

6. A muffler with a gas-scavenging effect as claimed in claim 1, wherein a space is formed to enclose the outer circumference of the area from the flow-distributing chamber (2) to the accelerator (4) and the negative pressure chamber (5), and a housing (17) is disposed to externally seal this space, which makes up the bypass path (9) connecting the flow-distributing holes (7) with the sucking holes (8), and the bypass path (9) having an annular cross section.

7. A muffler with a gas-scavenging effect as claimed in claim 1, wherein many silencing holes (18) to deaden exhaust noise are formed on the wall faces of the accelerator (4) and/or the bypass path (9) though which the exhaust gas flows, approximately perpendicular to the flow direction, and a silencing part (19) including a closed space and a silencing material is disposed concentrically on the outer side of the silencing holes (18).

* * * * *